Oct. 26, 1954  H. DRIESCH  2,692,645
METHOD AND APPARATUS FOR PROCESSING SYNTHETIC THREADS
Filed June 8, 1951
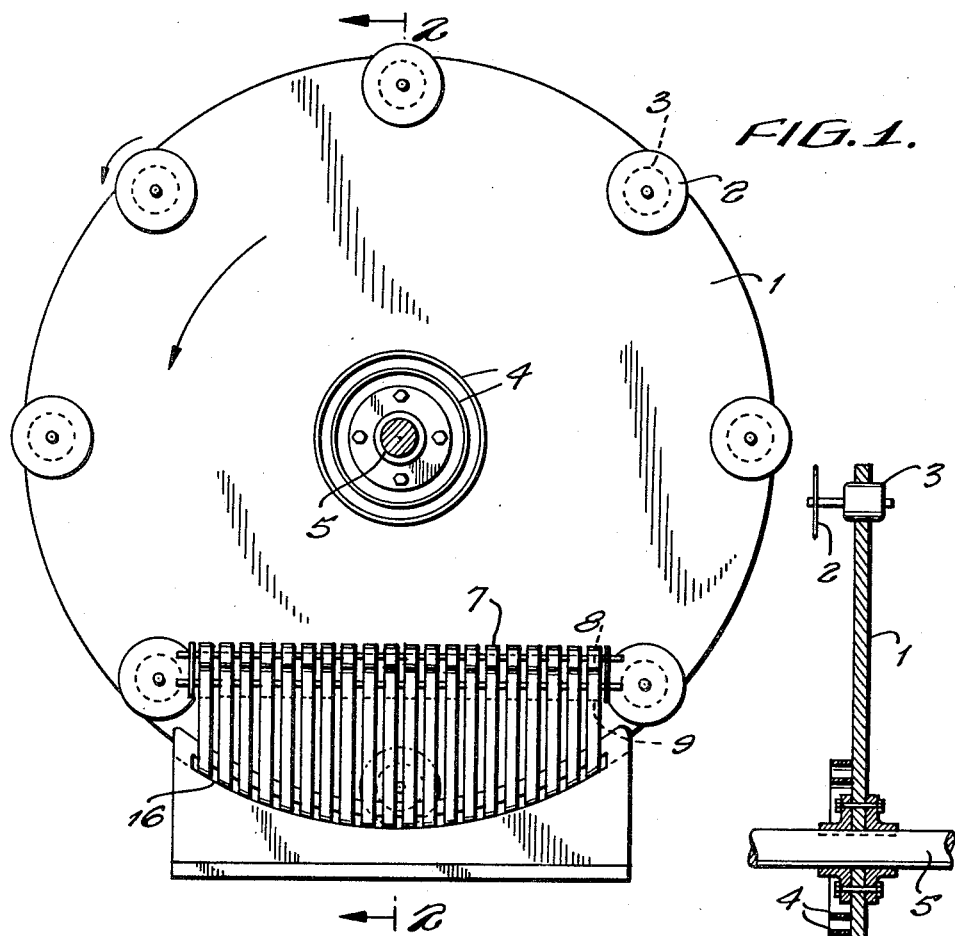
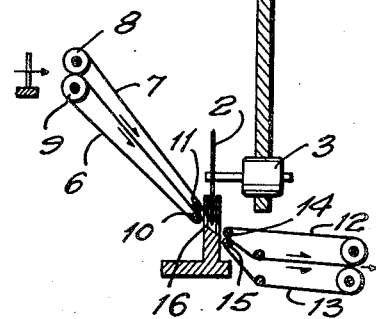
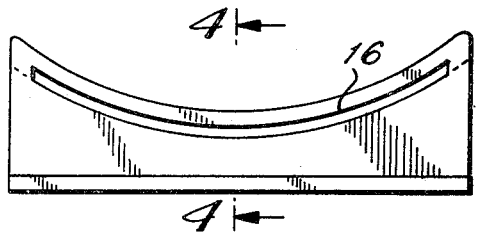
INVENTOR.
HANS DRIESCH
BY Patented Oct. 26, 1954

2,692,645

UNITED STATES PATENT OFFICE 2,692,645

METHOD AND APPARATUS FOR PROCESSING SYNTHETIC THREADS

Hans Driesch, Wuppertal-Barmen, Germany, assignor, by mesne assignments, to American Enka Corporation, Enka, N. C., a corporation of Delaware Application June 8, 1951, Serial No. 230,550

Claims priority, application Germany June 9, 1950

6 Claims. (Cl. 164—61)

The present invention relates to a method and apparatus for processing synthetic threads at an intermediate stage of the manufacture thereof into yarn.

Synthetic threads are usually delivered in continuous, substantially endless lengths from the apparatus in which they are produced, and it is necessary to cut these threads into small sections so that the same may be processed into a yarn in a spinning machine. Many devices have already been provided for cutting such synthetic threads into small sections for this purpose, and in many of these devices a plurality of the synthetic threads are guided along a predetermined path while being maintained in substantially parallel relation to each other. Most of the known devices for accomplishing these results have certain inherent defects in them which have thus far not been overcome. Among these defects are the following:

(1) The parallel relationship of the threads is not always maintained to the required degree;

(2) The uniformity of the distribution of the several threads is not accurately maintained which results in later disadvantages;

(3) The lengths of the cut sections of the threads can only be changed by exchanging the principal element of the device;

(4) With some of the known cutting means of the known devices a more or less strong crushing of the threads occurs and there results a stoppage in the flow of the threads; and (5) The known devices are extremely complicated so that there results great difficulties in the operation and adjustment of such devices which renders them unsuitable for continuous production of large quantities of material.

It is an object of the present invention to overcome all of the above-mentioned disadvantages of known devices.

A further object of the present invention is to guide a plurality of synthetic threads along a predetermined path while maintaining the same parallel to each other.

An additional object of the present invention is to cut the threads in such a way that the flow thereof is not held up in any way and so that a bunching up of the threads will not result.

Still another object of the present invention is to provide a device in which the cutting angle at which the threads are cut may be easily controlled and changed.

With the above objects in view the present invention mainly consists of a process and apparatus for conveying a plurality of synthetic threads along a predetermined path while maintaining the same in parallel relation with respect to each other. While the threads are moved along the path the ends thereof are gripped by the moving means before they are cut so that it is not possible for any of the cut sections to become loose and unguided in the apparatus. The cutting of the threads takes place along a line which is substantially perpendicular to the path along which the threads move, and since the cutting blades progressively move across this path there results a cutting line which is inclined with respect to the path along which the threads move. By adjusting the moving speed of the threads and the cutting means it is possible to vary the angle of this cutting line, and also it is possible to further vary this angle by altering the path of movement of the threads with respect to the cutting means. There thus results sections of the threads in elongated bands which are inclined to the path along which the threads move and in which the thread sections are all parallel to each other, so that as the bands issue from the device a pointed end of the bands first moves ahead of the remaining part of the band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 discloses a side elevational view of one possible apparatus constructed in accordance with the present invention and capable of carrying out the process thereof;

Fig. 2 is a side view, partially in section and partially diagrammatic, of the structure illustrated in Fig. 1 taken along line 2—2 of Fig. 1 in the direction of the arrows; and Figs. 3 and 4 are respectively side and end views, the latter partially in section and taken along line 4—4 of Fig. 3 in the direction of the arrows, of a detail of the structure shown in Figs. 1 and 2.

Referring to Fig. 2 of the drawings there is shown diagrammatically a comb or perforated plate 17 through which the synthetic threads are guided in substantially parallel relation with respect to each other and by means of which the separate synthetic threads are spread out. From the comb or perforated plate 17, the threads enter the inlet side of a plurality of belts 6 and 7 which are mounted on pulleys 8–11, as illustrated in Figs. 1 and 2, so as to be moved thereby. It will be noted that the pulleys 9 and 10 rotate the belts 6 in a direction opposite to that in which the pulleys 8 and 11 operate the belts 7 so that the adjacent portions of the belts 6 and 7 move in the same direction as indicated by the arrows in Fig. 2. These adjacent portions of the belts 6 and 7 are in contact with each other so that when the synthetic threads enter at the inlet side of the belts 6 and 7 they are respectively gripped by the same and moved in the direction of the arrows, shown in Fig. 2, to the blade guide means located at the outlet side of the belts 6 and 7 adjacent to the pulleys 10 and 11.

It will be noted from Fig. 1 that the outlet side of the blades 6 and 7 is located along an arc of a circle. The blade guide means is illustrated in Figs. 3 and 4 and comprises an elongated member which has a central recess extending inwardly from the upper side thereof and having a floor which is located along an arc of substantially the same size as the arc of the outlet side of the belts 6 and 7. The blade guide means is also formed with an arcuate slot 16 which extends therewith and which is also formed along an arc of substantially the same size as the arc of the outlet side of the belts 6 and 7. On the other side of the blade guide means from the belts 6 and 7 are the belts 12 and 13 which are guided over pulleys in a manner similar to the belts 6 and 7. The pulleys 14 and 15 around which the belts 12 and 13 respectively rotate are located closely adjacent to the slot 16, and it will be noted that the belts 12 and 13 have adjacent contacting portions which move in the same direction as the contacting portions of the belts 6 and 7 so that threads which are guided through the belts 6 and 7 pass through the slot 16 and are carried along by the belts 12 and 13 to be further processed. It will be seen that the pulleys at the outlet side of belts 6 and 7 and the inlet side of belts 12 and 13 are substantially smaller than the pulleys at the inlet side of belts 6 and 7 and the outlet side of belts 12 and 13. These pulleys 10, 11, 14 and 15 each have a diameter which is approximately equal to one half of the width of the slot 16. Due to this relatively small size of these pulleys it is possible for the contacting portions of the belts 6 and 7 at the outlet side thereof and the belts 12 and 13 at the inlet side thereof to be located very near to the blade guide means so that in this way the synthetic threads are free from the belts for an extremely small length of time, and therefore the movement thereof may be controlled to an extremely high degree.

Of course, the pulleys 14 and 15 are also arranged along an arc of substantially the same size as the arc at the outlet side of the belts 6 and 7, and it will be seen from Figs. 2 and 4 that in the particular embodiment illustrated where the threads are moved downwardly by the belts 6 and 7, the floor of the slot 16 is also inclined in the same direction so as not to interfere with the movement of the threads to the inlet side of the belts 12 and 13.

The cutting means of the apparatus and process of the present invention comprises a rotatably mounted disc 1 which has a radius of substantially the same size as the radius of the arc at the outlet side of the belts 6 and 7 and which is mounted for rotation with the rotatably mounted shaft 5 so that the blades 2, which are in the form of planar discs, will pass through the recess in the blade guide means and across the predetermined path along which the synthetic threads move. As is evident from Fig. 1, the blade discs 2 will successively pass through the blade guide means and across the path of the synthetic threads as the disc 1 is rotated so that the above-described cutting means enables a cutting blade to move across the threads at predetermined intervals.

The several blade discs 2 are individually mounted for rotation about their axes and are operatively connected to the motors 3 which are respectively mounted in the disc 1 so as to rotate the blades 2 and simultaneously support the same from the disc 1. The disc 1 carries a pair of insulated, electrically conductive, concentric rings 4 which may have brushes operatively connected thereto and to the motors 3 so that electrical current may be supplied to the latter to rotate the blade discs 2.

When operating the above-described apparatus, a plurality of synthetic threads are continually drawn into the inlet side of the belts 6 and 7 by the movement thereof and by the gripping action thereof which moves the threads in the direction of the arrows shown in Fig. 2. These threads are pulled through the comb or perforated plate 17, and it is readily apparent that the belts 6 and 7 efficiently maintain the several threads in parallel relation with respect to each other as they are moved to the outlet side of belts 6 and 7 into the slot 16. When the threads emerge from the slots 16, they are immediately gripped and moved by the belts 12 and 13 in the direction of the arrows shown in Fig. 2 so as to deliver the same to further apparatus for further processing. As the threads are thus moved through the slot 16, the blades 2 pass thereover. The blades 2 are quite sharp and due to the fact that they are rotated at a relatively high speed about their own axes they very quickly and easily cut the several threads so that each thread is cut in a very smooth quick manner over an extremely small length thereof, which does not amount to more than the width of a point. In this way the continuous movement of the threads is not disturbed in any way by the cutting thereof.

Since the blades 2 move across the path of movement of the threads, it is apparent that each blade 2 will first cut one of the threads at one side of the spread out plurality of parallel threads and then progressively pass along the plurality of threads until the last thread at the opposite side of this plurality of threads is cut. In this way the plurality of threads will be cut along lines which are at an angle to the path of movement of the threads, and there will thus be produced a plurality of successive bands of separate sections of the synthetic threads. In each of these bands the thread sections will be parallel to each other and each of these bands will extend along a line which is inclined to the path of movement of the threads. It is apparent that by regulating the speed of movement of the belts 6, 7, 12 and 13 and the speed of rotation of the disc 1 the angle of inclination of these bands of thread sections may be accurately controlled. This angle of inclination of the bands may be further regulated by regulating the angular relationship between the belts 6 and 7 with respect to the blade guide means and may be even further regulated by regulating the angle at which the threads are introduced at the inlet side of the belts 6 and 7.

The belts 6, 7, 12 and 13 are moved at a predetermined speed with respect to the speed of rotation of the disc 1 so that after one of the blades 2 moves across the moving threads the next blade 2 does not move across the moving threads until the uncut end portions of the threads are gripped by the belts 12 and 13. In other words, each thread is already gripped by the belts 12 and 13 when it is cut by the blades 2 so that in this way it is not possible for a cut section of any of the threads to become loose in the apparatus, and since each of the threads is already gripped and guided by the belts 12 and 13 when it is cut the parallel relationship of the threads after they are cut is guaranteed. This latter result is obtained by making the time intervals at which the successive blades 2 pass across the threads slightly greater than the length of time required for a point to traverse the distance between the outlet side of belts 6 and 7 and the inlet side of belts 12 and 13 at the speed at which the threads are moved by these belts and along the path they move in.

As is shown diagrammatically in Fig. 2 a roller means may be provided for automatically taking up any stretching which may occur in the belts.

In addition to controlling the angle of the bands of thread sections with respect to the path of movement of the threads, it obviously is also possible to control the lengths of the separate sections of the threads by regulating the speed of rotation of the disc 1 with respect to the speed of movement of the belts. By means of the above-described relatively small rollers 10, 11, 14 and 15 which are located closely adjacent to the blade guide means, the distance from the outlet side of belts 6 and 7 to the inlet side of belts 12 and 13 is quite small so that the above-described apparatus is capable of producing even the smallest lengths of cut sections which are ordinarily used, such as for example thread sections having a length of 30–40 mm. Due to the above-described arrangement, it is apparent that the separate threads are gripped and guided on both sides of the blades 2 when the latter cut them so that the position of the threads is in no way disturbed by the cutting thereof.

It will be understood that each of the elements described above, or two or more together, may also find a useful application in other types of method and apparatus for processing synthetic threads differing from the types described above.

While the invention has been illustrated and described as embodied in a method and apparatus for cutting parallel synthetic threads into a plurality of bands of thread sections in which the thread sections are maintained in parallel relation with respect to each other and with these bands extending at an angle to the path of movement of the threads, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for cutting synthetic threads into sections, comprising in combination, a first pair of endless belts located in overlying relation with respect to each other and having the adjacent belt portions thereof in contact with each other; first moving means operatively connected to said first pair of belts for moving the same at a predetermined speed in opposite directions so that the adjacent contacting portions thereof move in the same direction; a second pair of endless belts located in overlying relation with respect to each other and being spaced from said first pair of endless belts, said second pair of endless belts also having the adjacent belt portions thereof in contact with each other and said first and second pairs of endless belts being located along a predetermined path; second moving means operatively connected to said second pair of belts for moving the same at said predetermined speed in opposite directions so that said adjacent contacting portions thereof move in the same direction with respect to each other and in the same direction as said adjacent contacting portions of said first pair of endless belts; movable cutting means located between said first and second pairs of endless belts and being mounted for movement along a line substantially perpendicular to said predetermined path; actuating means operatively connected to said cutting means for periodically moving the same across said predetermined path at time intervals which are greater than the length of time required for a point to traverse the distance between said first and second pairs of belts along said predetermined path at said predetermined speed, whereby synthetic threads guided by said first pair of belts will be received by said second pair of belts before being cut by said cutting means; and elongated guide means extending in a direction substantially perpendicular to said predetermined path and being located between said first and second pairs of endless belts for guiding said cutting means, said guide means being almost as wide as the distance between said first and second pairs of belts and being only slightly spaced therefrom and said guide means being formed with an elongated slot extending therethrough and having a central longitudinal axis located at the level of said predetermined path so that synthetic threads passing from said first to said second pair of belts pass through said slot.

2. Apparatus for cutting synthetic threads into sections, comprising in combination, a first pair of endless belts located in overlying relation with respect to each other and having the adjacent belt portions thereof in contact with each other; first moving means operatively connected to said first pair of belts for moving the same at a predetermined speed in opposite directions so that the adjacent contacting portions thereof move in the same direction; a second pair of endless belts located in overlying relation with respect to each other and being spaced from said first pair of endless belts, said second pair of endless belts also having the adjacent belt portions thereof in contact with each other and said first and second pairs of endless belts being located along a predetermined path; second moving means operatively connected to said second pair of belts for moving the same at said predetermined speed in opposite directions so that said adjacent contacting portions thereof move in the same direction with respect to each other and in the same direction as said adjacent contacting portions of said first pair of endless belts; movable cutting means located between said first and second pairs of endless belts and being mounted for movement along a line substantially perpendicular to said predetermined path; actuating means operatively connected to said cutting means for periodically moving the same across said predetermined path at time intervals which are greater than the length of time required for a point to traverse the distance between said first and second pairs of belts along said predetermined path at said predetermined speed, whereby synthetic threads guided by said first pair of belts will be received by said second pair of belts before being cut by said cutting means; and elongated guide means extending in a direction substantially perpendicular to said predetermined path and being located between said first and second pairs of endless belts for guiding said cutting means, said guide means being almost as wide as the distance between said first and second pairs of belts and being only slightly spaced therefrom and said guide means being formed with an elongated slot extending therethrough and having a central longitudinal axis located at the level of said predetermined path so that synthetic threads passing from said first to said second pair of belts pass through said slot, said first and second moving means each comprising a pair of pulleys for said first and second pairs of belts, respectively, said pairs of pulleys being respectively located on opposite sides of said slot and each of said pulleys being of a diameter which is approximately equal to one half of the width of said slot.

3. Apparatus for cutting a plurality of synthetic threads into sections, comprising in combination, a plurality of adjacent first pairs of endless belts located in substantially parallel relation with respect to each other, each of said first pairs of endless belts comprising a pair of endless belts which are in overlying relation with respect to each other and which have the adjacent portions thereof in contact with each other, said plurality of first pairs of belts having an inlet side and an outlet side, and said outlet side being curved along a first arc of a circle; a plurality of adjacent second pairs of endless belts located in substantially parallel relation with respect to each other, each of said second pairs of endless belts comprising a pair of endless belts which are located in overlying relation with respect to each other and which have the adjacent portions thereof in contact with each other, said first and second pairs of belts being located along a predetermined path and being spaced from each other, said plurality of second pairs of endless belts having an inlet side which is curved along a second arc of substantially the same size as said first arc, and said inlet side of said plurality of said second pairs of belts being located opposite and adjacent to said outlet side of said plurality of first pairs of belts; elongated blade guide means located in the space between said first pairs of belts and said second pairs of belts and substantially filling said space, said guide means extending in a direction substantially perpendicular to and intersecting said predetermined path and being formed with an elongated recess extending into the same and being also located across said predetermined path, said elongated recess having an arcuate floor formed along a third arc of substantially the same size as said first and second arcs, and said guide means being formed with an arcuate slot extending therethrough and across said recess and being formed along a fourth arc which is of substantially the same size as said above-mentioned arcs, said slot being located at the level of said predetermined path so that threads may pass through the same from said plurality of first pairs of belts to said plurality of second pairs of belts; a rotatably mounted disc located adjacent to said guide means, said disc having a radius which is substantially equal to the radius of said above-mentioned arcs and said disc having the outer periphery thereof located substantially at the level of said slot and spaced therefrom; and a plurality of equally spaced blades located about the peripheral portion of said disc and being spaced from said disc by a distance substantially equal to the distance between said recess and said disc so that when said disc is rotated said blades successively pass through said recess across said predetermined path so as to thereby periodically cut threads passing through said slot.

4. Apparatus for cutting a plurality of synthetic threads into sections, comprising in combination, a plurality of adjacent first pairs of endless belts located in substantially parallel relation with respect to each other, each of said first pairs of endless belts comprising a pair of endless belts which are in overlying relation with respect to each other and which have the adjacent portions thereof in contact with each other, said plurality of first pairs of belts having an inlet side and an outlet side, and said outlet side being curved along a first arc of a circle; a plurality of adjacent second pairs of endless belts located in substantially parallel relation with respect to each other, each of said second pairs of endless belts comprising a pair of endless belts which are located in overlying relation with respect to each other and which have the adjacent portions thereof in contact with each other, said first and second pairs of belts being located along a predetermined path and being spaced from each other, said plurality of second pairs of endless belts having an inlet side which is curved along a second arc of substantially the same size as said first arc, and said inlet side of said plurality of said second pairs of belts being located opposite and adjacent to said outlet side of said plurality of first pairs of belts; elongated blade guide means located in the space between said first pairs of belts and said second pairs of belts and substantially filling said space, said guide means extending in a direction substantially perpendicular to and intersecting said predetermined path and being formed with an elongated recess extending into the same and being also located across said predetermined path, said elongated recess having an arcuate floor formed along a third arc of substantially the same size as said first and second arcs, and said guide means being formed with an arcuate slot extending therethrough and across said recess and being formed along a fourth arc which is of substantially the same size as said above-mentioned arcs, said slot being located at the level of said predetermined path so that threads may pass through the same from said plurality of first pairs of belts to said plurality of said second pairs of belts; means for moving said belts comprising pairs of pulleys respectively associated with said pairs of belts and located adjacent to said guide means on opposite sides thereof, each of said pulleys having a diameter which is approximately equal to one-half of the width of said slot; a rotatably mounted disc located adjacent to said guide means, said disc having a radius which is substantially equal to the radius of said above-mentioned arcs and said disc having the outer periphery thereof located substantially at the level of said slot and spaced therefrom; and a plurality of equally spaced blades located about the peripheral portion of said disc and being spaced from said disc by a distance substantially equal to the distance between said recess and said disc so that when said disc is rotated said blades successively pass through said recess across said predetermined path so as to thereby periodically cut threads passing through said slot.

5. Apparatus for cutting a plurality of synthetic threads into sections, comprising in combination, a plurality of adjacent first pairs of endless belts located in substantially parallel relation with respect to each other, each of said first pairs of endless belts comprising a pair of endless belts which are in overlying relation with respect to each other and which have the adjacent portions thereof in contact with each other, said plurality of first pairs of belts having an inlet side and an outlet side, and said outlet side being curved along a first arc of a circle; a plurality of adjacent second pairs of endless belts located in substantially parallel relation with respect to each other, each of said second pairs of endless belts comprising a pair of endless belts which are located in overlying relation with respect to each other and which have the adjacent portions thereof in contact with each other, said first and second pairs of belts being located along a predetermined path and being spaced from each other, said plurality of second pairs of endless belts having an inlet side which is curved along a second arc of substantially the same size as said first arc, and said inlet side of said plurality of said second pairs of belts being located opposite and adjacent to said outlet side of said plurality of first pairs of belts; elongated blade guide means located in the space between said first pairs of belts and said second pairs of belts and substantially filling said space, said guide means extending in a direction substantially perpendicular to and intersecting said predetermined path and being formed with an elongated recess extending into the same and being also located across said predetermined path, said elongated recess having an arcuate floor formed along a third arc of substantially the same size as said first and second arcs, and said guide means being formed with an arcuate slot extending therethrough and across said recess and being formed along a fourth arc which is of substantially the same size as said above-mentioned arcs, said slot being located at the level of said predetermined path so that threads may pass through the same from said plurality of first pairs of belts to said plurality of said second pairs of belts; a rotatably mounted disc located adjacent to said guide means, said disc having a radius which is substantially equal to the radius of said above-mentioned arcs and said disc having the outer periphery thereof located substantially at the level of said slot and spaced therefrom; and a plurality of equally spaced blades located about the peripheral portion of said disc and being spaced from said disc by a distance substantially equal to the distance between said recess and said disc so that when said disc is rotated said blades successively pass through said recess across said predetermined path so as to thereby periodically cut threads passing through said slot, said blades each being in the form of a planar disc.

6. Apparatus for cutting a plurality of synthetic threads into sections, comprising in combination, a plurality of adjacent first pairs of endless belts located in substantially parallel relation with respect to each other, each of said first pairs of endless belts comprising a pair of endless belts which are in overlying relation with respect to each other and which have the adjacent portions thereof in contact with each other, said plurality of first pairs of belts having an inlet side and an outlet side, and said outlet side being curved along a first arc of a circle; a plurality of adjacent second pairs of endless belts located in substantially parallel relation with respect to each other, each of said second pairs of endless belts comprising a pair of endless belts which are located in overlying relation with respect to each other and which have the adjacent portions thereof in contact with each other, said first and second pairs of belts being located along a predetermined path and being spaced from each other, said plurality of second pairs of endless belts having an inlet side which is curved along a second arc of substantially the same size as said first arc, and said inlet side of said plurality of said second pairs of belts being located opposite and adjacent to said outlet side of said plurality of first pairs of belts; elongated blade guide means located in the space between said first pairs of belts and said second pairs of belts and substantially filling said space, said guide means extending in a direction substantially perpendicular to and intersecting said predetermined path and being formed with an elongated recess extending into the same and being also located across said predetermined path, said elongated recess having an arcuate floor formed along a third arc of substantially the same size as said first and second arcs, and said guide means being formed with an arcuate slot extending therethrough and across said recess and being formed along a fourth arc which is of substantially the same size as said above-mentioned arcs, said slot being located at the level of said predetermined path so that threads may pass through the same from said plurality of first pairs of belts to said plurality of said second pairs of belts; a rotatably mounted disc located adjacent to said guide means, said disc having a radius which is substantially equal to the radius of said above-mentioned arcs and said disc having the outer periphery thereof located substantially at the level of said slot and spaced therefrom; a plurality of equally spaced, rotatably mounted blades located about the peripheral portion of said disc and being spaced from said disc by a distance substantially equal to the distance between said recess and said disc so that when said disc is rotated said blades successively pass through said recess across said predetermined path so as to thereby periodically cut threads passing through said slot, said blades each being in the form of a planar disc; and means for rotating said blades about their axes while the same are moving through said recess.

References Cited in the file of this patent

UNITED STATES PATENTS

| Number | Name | Date |
| --- | --- | --- |
| 974,198 | Smith | Nov. 1, 1910 |
| 1,047,493 | Bryant | Dec. 17, 1912 |
| 1,077,923 | Witham et al. | Nov. 4, 1913 |
| 1,197,370 | Helm | Sept. 5, 1916 |
| 1,594,883 | Holmberg et al. | Aug. 3, 1926 |
| 1,819,991 | Stevens | Aug. 18, 1931 |
| 2,184,452 | Grunnert | Dec. 26, 1939 |
| 2,234,330 | Zetzsche et al. | Mar. 11, 1941 |
| 2,544,241 | Sternad et al. | Mar. 6, 1951 |
| 2,587,732 | Jaeger | Mar. 4, 1952 |